United States Patent Office 2,907,419
Patented Oct. 6, 1959

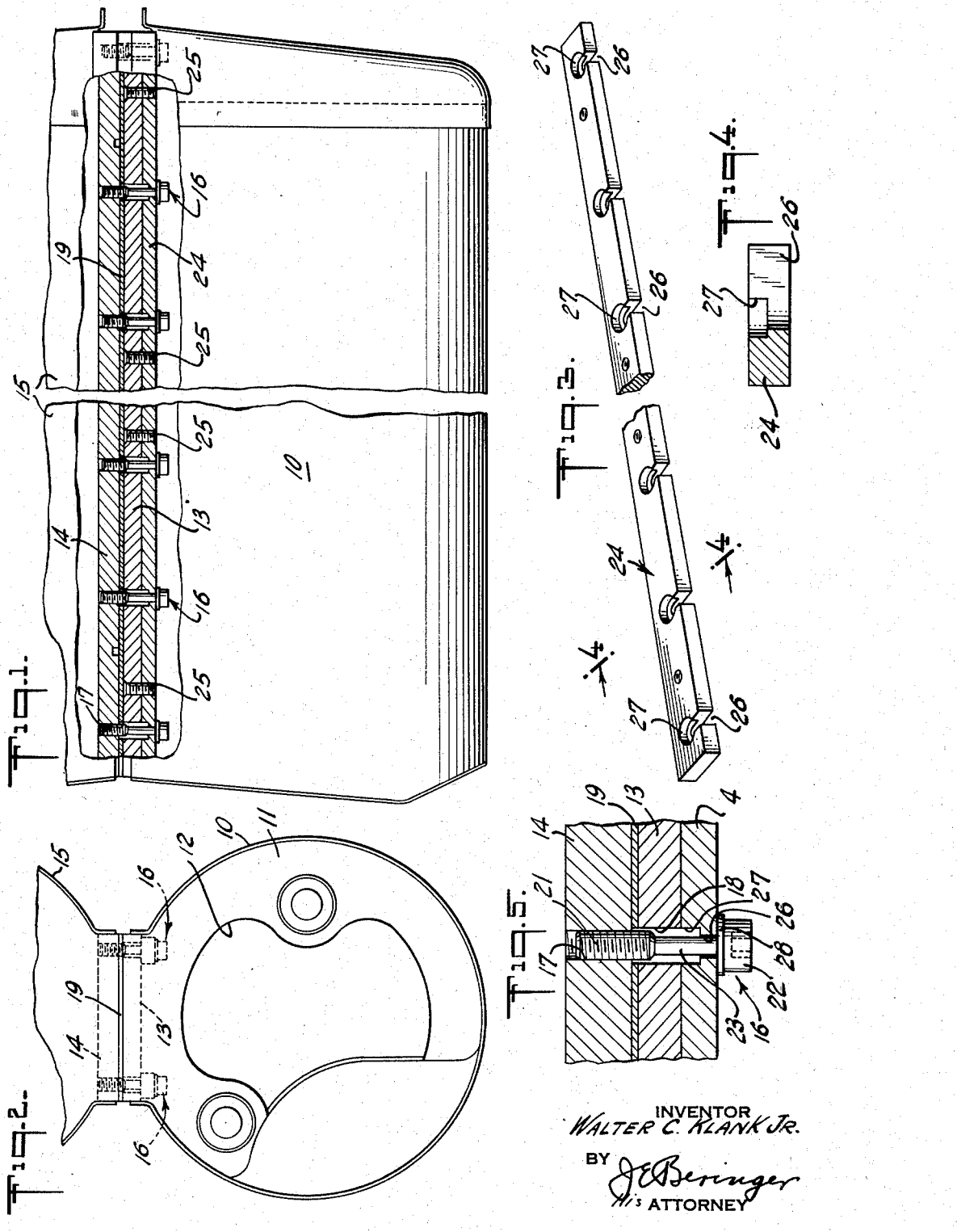

2,907,419

MOUNTING PLATE ASSEMBLY WITH LATCHED BOLTS

Walter C. Klank, Jr., Dayton, Ohio, assignor to United Aircraft Products, Inc., Dayton, Ohio, a corporation of Ohio Application February 13, 1957, Serial No. 640,005

1 Claim. (Cl. 189—36)

This invention relates to mounting plate assemblies, and particularly to means for avoiding loss of detachable connector devices in effecting a connection in places of limited access.

In a certain type of oil tank for aircraft, for example, a pair of hoppers is installed in side by side relation within a larger tank holding the main body of stored oil. These hoppers are detachably connected to one another by threaded bolts installed in mating flanges thereof. On account of space limitation, the hoppers must be introduced into the tank singly and the connection to one another effected under conditions of limited access and visibility, accenting the possibility that a connecting bolt will be dropped. Bolts so dropped are for practical purposes irretrievable and present an operating hazard since they may work their way into the lines leading from the oil supply tank to the engine, or to the hydraulic actuating devices or like places of use of the liquid stored in the tank.

An object of this invention is to obviate mishaps as described by constructing as a part of one of the hopper devices a mounting plate assembly characterized by attachment bolts which are relatively adjustable for mounting purposes but which cannot be inadvertently detached.

Another object of the invention is to present a mounting plate assembly of general utility characterized by captive mounting bolts, substantially as described.

A further object of the invention is to provide a generally new bolt and bolt retainer combination forming a part of a unitary plate assembly.

Other objects and structural details of the invention will appear from the following description when read in connection with the accompanying drawings, wherein:

Fig. 1 is a view in side elevation of a hopper assembly as described, showing one of the hoppers in fragmentary form and being broken away in the region of abutment of the two hoppers to show the connecting means in accordance with the illustrated embodiment of the present invention;

Fig. 2 is a view in end elevation of the assembly of Fig. 1;

Fig. 3 is a view in perspective of a bolt retaining bar forming a part of the mounting plate assembly of the present invention;

Fig. 4 is a view in cross-section taken substantially along the line 4—4 of Fig. 3; and Fig. 5 is an enlarged view of a single bolt connection as shown in Fig. 1.

Referring to the drawings, in the hopper assembly which serves as the illustrative application of the invention, a hopper 10 is made up of a generally cylindrical shell and a closure 11 for one end thereof providing an opening 12. Extending longitudinally of the shell 10, and in effect completing the cylindrical formation thereof, is a cast metal pad or flange 13. In mating relation to the flange 13 is a flange 14 of a second hopper which further comprises a shell 15. The two hoppers are substantially identical and communicate with one another, in a manner not here shown, in the performance of the function of the apparatus of which the hoppers are a part. The hoppers are detachably joined together by screw type bolts 16. Accessible only through the end opening 12 in the first described hopper the bolts 16 are adjustable in a first sense to connect the hoppers one to another and adjustable in the opposite sense to disconnect the hoppers.

According to the instant inventive concept, the bolts 16 are a part of a mounting plate assembly which permits adjustment of the bolts without possibility of loss thereof into the bottom of the hopper.

As shown in Figs. 1 and 5, while the joined hoppers are essentially identical, the pad or flange 14 of the one device is provided with internally threaded recesses or openings 17 of relatively smaller diameter than through openings 18 in the pad or flange 13. Preparatory to assembly, the hoppers are placed in back to back relation, with the flanges 13 and 14 in mating, abutting relation either directly or through an interposed gasket 19 or the like. Respective openings 17 and 18 in the flanges are aligned with one another and a connection between the flanges is effected through the bolts 16 which are adapted to be received in the described openings.

More particularly, each bolt 16 is formed with a threaded shank portion 21 adapted to make a threaded engagement in the opening 17 and relatively smaller in diameter than the opening 18 so that the bolt may move freely in a longitudinal sense relatively to the pad or flange 13. The screw threaded shank portion 21 occupies one end of the bolt 16. At the other end thereof is an enlarged head portion 22 while intermediate the threaded portion and the head portion is a shank portion 23 reduced in diameter relatively to threaded portion 21. On one side of the flange 13, the threaded portion 21 of the bolt is extensible through and beyond one end of the opening 18. On the other side of the flange 13 the reduced diameter shank portion 23 projects through and beyond the opening 18. There is interposed between the head portion 22 of the several bolts 16, and the shank portion 21 thereof, a bolt retaining bar 24 which is secured to the flange 13 by flat head screws 25. At spaced apart locations along the length of the bar 24, at points adapted to coincide with respective bolts 16, are slots 26 opening through what may be considered to be the bottom edge of the bar. The slots 26 are thus aligned with the openings 17 and 18 in the flanges 14 and 13, and portions thereof register with respective ends of openings 18. These portions of the slots 26 are formed as recesses 27 opening through the side of the bar in a manner to serve as continuations of the openings 18. Thus, each recess 27 is of a size freely to receive the threaded shank portion 21 of a respective bolt 16. The slots 26, however, are of a size closely to interfit with or to receive the reduced diameter shank portion 23 of the bolts. The slots are too narrow to pass either the head portion 22 of the bolts or the threaded portions 21 thereof. With the bolt retaining bar 24 installed on the flange 13 in interengaged relation to the bolts 16, therefore, the bolts are locked against withdrawal from the flange in either direction. The reduced diameter shank portion 23 is elongated relatively to the width of the bar 24 so that the bolt may be adjusted in a longitudinal sense relatively to the flange 13 and to the bar 24. According to the proportion of the parts, the length of the threaded portion 21 of the bolts is approximately equal to the length of opening 18 plus the length or depth of recess 27. Thus, the whole of the threaded portion 21 of each bolt can be accommodated in the opening 18 and its extension 27. Each bolt may be completely retracted from threaded engagement with the flange 14, therefore, without the need for initially separating the hoppers.

The head 22 of each bolt 16 in the present instance engages the retaining bar 24 through a washer 27. The head could, of course, be made with the washer 27 integral therewith.

It will be understood that the flange 13, bolts 16, and bolt retaining bar 24 constitute a unitary mounting plate assembly in terms of general utility. Thus, the member 13 is a mounting plate applicable to any manner of device having a tapped or internally threaded opening such as the opening 17 of flange 14. The bolt 16, of which there may be one or a plurality, is held captive upon the mounting plate through the locking bar 24 which is common to the several bolts. The bolt may be readily adjusted in extending and retracting movements relatively to the mounting plate, whereby respectively to secure the plate to a part 14 or the like, through axial pressure applied through the head 22 and bar 24, and to disengage the mounting plate therefrom. The mounting plate assembly as described has the character of a sub-assembly, prior to completing the connection of which it is a part. Thus, the first described hopper is assembled with the bolt retaining bar 24 secured in place upon the flange or plate 13 prior to the bringing of the hopper devices into position for connection. When the devices are so prepared or positioned, the screw threaded ends 21 of the bolts are inserted into respective threaded openings 17 and turned until the flanges 13 and 14 are secured tightly to one another.

The threaded shank portions 21 hereof may contain selflocking features such as a laterally projecting insert of synthetic material which tends to resist the inadvertent disengagement of the bolts as a result of vibration. The instant invention is concerned with a construction and arrangement of parts guarding against loss of the attachment bolts in the course of assembly. The invention will, of course, function also to prevent a bolt from dropping out of the assembly even though it should become loose in its threaded recess 17.

What is claimed is:

A mounting plate assembly, including a bolt having a head, a threaded shank and an intermediate unthreaded shank portion smaller in diameter than the head and the threaded shank portion, a mounting plate having a through opening therein, the shank of said bolt being received in said opening with freedom of relative axial motion, a rigid and non-deformable bolt retainer installed between the head of the bolt and said plate having a slot interfitting with the reduced diameter shank portion of the bolt, said bolt retainer having a recess aligned with said slot and forming a continuation of the opening in said mounting plate, said opening and continuation thereof being of a length to receive the whole of said threaded shank portion and said reduced diameter shank portion being elongated to permit said threaded shank portion to be withdrawn into said opening and continuation thereof, and means fastening said bolt retainer to said plate.

References Cited in the file of this patent

UNITED STATES PATENTS

| 837,134 | Shuster | Nov. 27, 1906 |
| 856,246 | Gamon | June 11, 1907 |
| 1,491,394 | Griffith et al. | Apr. 22, 1924 |
| 1,495,565 | Yorke | May 27, 1924 |
| 1,788,408 | Raybould | Jan. 13, 1931 |
| 2,374,309 | Roxs | Apr. 24, 1945 |
| 2,761,484 | Sternick et al. | Sept. 4, 1956 |

FOREIGN PATENTS

| 395,321 | Great Britain | 1933 |